United States Patent
Shimizu et al.

[11] Patent Number: 6,069,098
[45] Date of Patent: *May 30, 2000

[54] MORTAR SUBSTRATE SHEET

[75] Inventors: Yutaka Shimizu, Komatsu; Yoshimi Ueda; Eiji Koutani, both of Tokyo; Morihisa Otsuka, Fukui, all of Japan

[73] Assignee: Fukuvi Chemical Industry Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,658
[22] PCT Filed: Dec. 25, 1995
[86] PCT No.: PCT/JP95/02648
§ 371 Date: Aug. 7, 1996
§ 102(e) Date: Aug. 7, 1996
[87] PCT Pub. No.: WO96/20321
PCT Pub. Date: Jul. 4, 1996

[30] Foreign Application Priority Data

| Dec. 28, 1994 | [JP] | Japan | 6/328837 |
| Apr. 25, 1995 | [JP] | Japan | 7/101486 |
| Sep. 4, 1995 | [JP] | Japan | 7/226824 |

[51] Int. Cl.$^7$ ....................................................... B32B 27/12
[52] U.S. Cl. ......................... 442/381; 442/386; 442/394; 442/412; 428/912
[58] Field of Search ..................................... 442/386, 394, 442/381, 412; 425/84; 269/86; 428/912

[56] References Cited

FOREIGN PATENT DOCUMENTS

| 02128071 | 5/1990 | Japan . |
| 3-144065 | 6/1991 | Japan . |
| 4-4997 | 1/1992 | Japan . |
| 5-24768 | 3/1993 | Japan . |
| 05111909 | 5/1993 | Japan . |
| 6-287085 | 10/1994 | Japan . |

*Primary Examiner*—Elizabeth M. Cole
*Attorney, Agent, or Firm*—Biebel & French

[57] ABSTRACT

A mortar substrate sheet, for placement between a substrate and mortar to be coated during installation of mortar to an outer wall of a building such as a house, comprising a water-resistant/moisture-permeable sheet 12 having water-resistant and moisture permeable properties, and a water absorption/retention sheet 13 having water absorbent and water retentive properties which is layered onto the front surface of this sheet 12, having a surface which is coated with water repellent agent having water repellent properties for only a designated period of time. Additionally, the reverse side of the water resistant/moisture-permeable sheet 12 has a resin layer 14 formed by coating or film-layering resins having elasticity. During installation, the mortar substrate sheet 11 is attached to the substrate with the resin layer 14 facing toward the substrate, lath is attached, then undercoat mortar 6 is coated. After the passage of a designated period of time, the water repellent property of the water repellent agent decreases, and water in the undercoat mortar is absorbed into the water absorption/retention sheet 13 and retained, as a result of which the undercoat mortar 6 goes into a semi-hardened state which allows the coating of the overcoat mortar 7.

6 Claims, 2 Drawing Sheets

PRIOR ART

MORTAR SUBSTRATE SHEET

This is a 371 of PCT/JP95/02648 filed Dec. 25, 1995.

BACKGROUND ART

Generally, when making the outer walls 1 of a building such as a house out of mortar walls, water-resistant asphalt-impregnated paper 3 is first attached over the substrate 2 of the building by means of staples 4, lath 5 is attached to that surface by means of staples 4, then undercoat mortar 6 and overcoat mortar 7 are coated in order to finish, as shown in FIG. 4.

In this case, when the overcoat mortar 7 is coated directly after the undercoat mortar 6 has been coated during finishing by coating with the overcoat mortar 7, there is the risk that the undercoat mortar 6 could crumble away under its own weight. Therefore, conventionally, the undercoat mortar 6 is cured to harden, then the surface of the undercoat mortar 6 is rinsed with water before the overcoat mortar 7 is coated for finishing.

However, with the above-mentioned installation procedure, there is a problem in that the installation work can become prolonged since the installation work must be halted for curing after the undercoat mortar 6 has been coated. Furthermore, the addition of more water than is required (surplus water) for a cement hydration reaction to the mortar 6, 7 for the purposes of contributing spreadability to the mortar 6, 7 and increasing the workability during coating also causes prolongation of the curing time.

On the other hand, during the summertime, direct exposure to sunlight of the mortar 6, 7 during curing often causes a dry-out phenomenon wherein the surface of the mortar 6, 7 dries too quickly and forms cracks.

Additionally, when the undercoat mortar 6 is coated onto an asphalt impregnated paper 3, water from the undercoat mortar 6 often moistens the substrate 2 by seeping through the holes of the staples 4, therefore running the risk of causing corrosion or the like.

Furthermore, there is the problem that the asphalt impregnated paper 3 is low in strength, so that it is easily torn during the installation work and can result in the generation of cracks in the outer wall 1 after installation, or make the mortar more prone to crumbling due to earthquakes or the like.

DISCLOSURE OF THE INVENTION

The present invention was made under consideration of the above-mentioned conditions, and has the object of offering a mortar substrate sheet which allows extremely simple installation work without creating problems such as crack formation, mortar crumbling, dry-out phenomena or substrate corrosion, and is also exceptionally strong.

That is, the present invention is a mortar substrate sheet, for placement between a substrate and mortar to be coated during installation of mortar to an outer wall of a building such as a house; characterized in that a water absorption/retention sheet having water absorbent and water retentive properties is layered onto the mortar side of a water-resistant/moisture-permeable sheet having water-resistant and moisture permeable properties. In this case, the above-mentioned water-resistant/moisture-permeable sheet should preferably comprise an unwoven fabric layer; and a resin layer, having elasticity, which is layered onto the surface on the substrate side of this unwoven fabric layer.

Additionally, a coating layer, which does not easily dissolve in water and dissolves in a strongly alkaline solution, may be formed on the surface of said water absorption/retention sheet.

In this case, a product obtained by adding polyvinyl alcohol to a co-polymer of polyvinyl acetate and acrylic acid, can be used in said coating layer.

Furthermore, wax can be added to the coating layer, or the surface can be coated with water repellent agent or the like, so as to contribute a water repellent property to the surface for a designated period of time.

Moreover, a reinforcement sheet which contributes a designated strength to the mortar substrate sheet can be layered onto the surface on the mortar side.

Also, at least one type of material selected from among paper, unwoven fabric, and woven fabric can be used in said water absorption/retention sheet.

BEST MODES FOR CARRYING OUT THE INVENTION

Hereinbelow, the embodiments of the mortar substrate sheet of the present invention will be explained with reference to the drawings.

Figure 1:
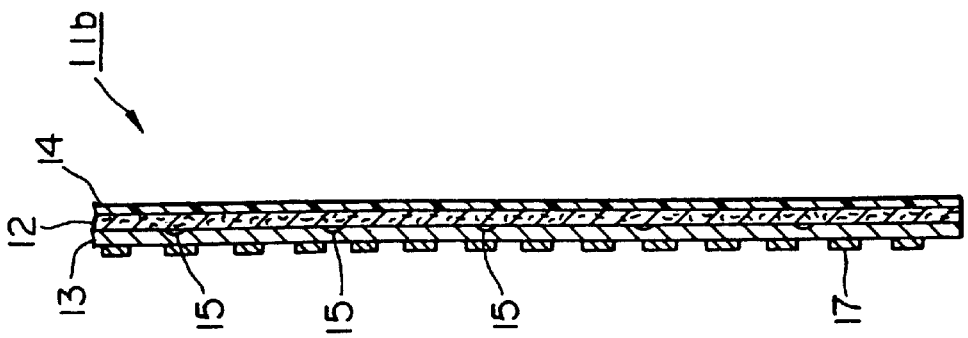
FIG. 1 is a section view showing an example of the structure of a mortar substrate sheet according to the present invention.

A first embodiment of the mortar substrate sheet according to the present invention is shown in FIG. 1. This mortar substrate sheet 11 comprises a water-resistant/moisture-permeable sheet 12 having water resistance and moisture permeability, and a water absorption/retention sheet 13 attached to the surface of the sheet 12 by means of adhesive 15.

The water absorption/retention sheet 13 is exceptionally water absorbent and water retentive; uses as its material a material selected from among paper, unwoven fabric and woven fabric, or layers thereof; and has a water repellent agent which is water-repellent for a designated period of time coated on the surface. Additionally, the rear surface of the water-resistant/moisture-permeable sheet 12 is a resin layer 14 formed by coating or film-layering resins having elasticity.

During installation, the mortar substrate sheet 11 is attached to the substrate 2 by means of staples 4 with the resin layer 14 facing toward the substrate 2, then lath 5 is attached to the front surface of the mortar substrate sheet 11, after which undercoat mortar 6 is applied. Then, the water repellent property of the water repellent agent suppresses the water absorption and water retention of the water absorption/retention sheet 13 during coating with the undercoat mortar 6. As a result, the spreadability of the undercoat mortar 6 is maintained and the coating work is easily performed.

After a designated period of time has passed after beginning the coating of the undercoat mortar 6, the water repellent effect of the water repellent agent is reduced, so that the moisture in the undercoat mortar 6 is absorbed and retained in the water absorption/retention sheet 13. As a result, the undercoat mortar goes into a semi-hardened state, so that the overcoat mortar 7 is able to be coated. That is, with this mortar undercoat sheet 11, there is no need to halt work over long periods of time in order to cure the undercoat mortar 6 after the undercoat mortar 6 has been coated, and the timespan of the installation work is made shorter.

Additionally, since the water absorption/retention sheet 13 has been made water repellent due to the water repellent agent coated on the surface, the water absorption/retention sheet 13 will not absorb surplus water even if the mortar substrate sheet 11 is made wet due to rain or the like. Therefore, problems such as insufficient water absorption during coating of the mortar 6, 7 can be prevented. Of course, the duration of the water repellent effect due to the water repellent agent can be changed as is appropriate depending upon the installation conditions such as location, season and weather.

Figure 2:
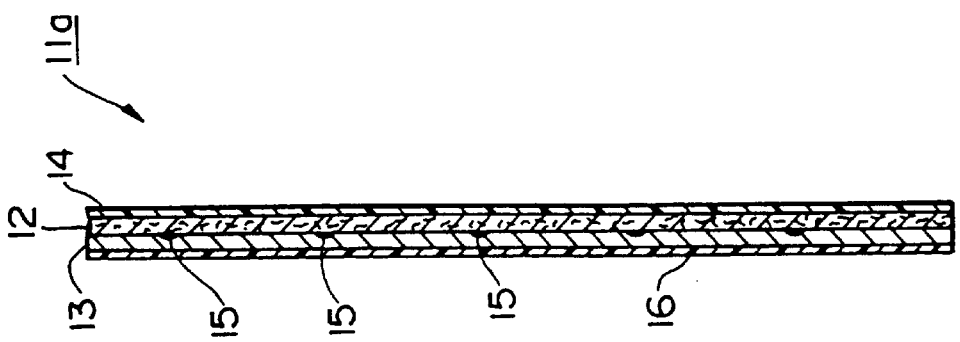
FIG. 2 is a section view showing an example of the structure of a mortar substrate sheet according to the present invention.

The second embodiment of the mortar substrate sheet according to the present invention is shown in FIG. 2. This mortar substrate sheet 11*a* has the same structure as that of FIG. 1, except that on the surface of the water absorption/retention sheet 13, a coating layer 16 which does not easily dissolve in water but dissolves in a strongly alkaline solution is formed instead of a water repellent agent. As a coating layer 16, a product obtained by adding polyvinyl alcohol to a copolymer of polyvinyl acetate and acrylic acid is used.

During installation, the mortar substrate sheet 11*a* is attached to the substrate 2 with the water absorption/retention sheet 13 on the substrate 2 side, the lath 5 is attached to the coating layer 16, then the undercoat mortar 6 is coated. Then, the property of the coating layer 16 of not dissolving in water suppresses the water absorption and water retention of the water absorption/retention sheet 13 during coating with the undercoat mortar 6. As a result, the spreadability of the undercoat mortar 6 is maintained and the coating work is easily performed.

After a designated period of time has passed after beginning the coating of the undercoat mortar 6, a strongly alkaline solution having a pH of approximately 14 from the cement in the mortar 6 dissolves the coating layer 16, so that the moisture in the undercoat mortar 6 is absorbed and retained in the water absorption/retention sheet 13. As a result, the undercoat mortar goes into a semi-hardened state, so that the overcoat mortar 7 is able to be coated.

That is, if the above-mentioned designated time is adjusted so that the coating layer 16 is dissolved when the coating of the undercoat mortar 6 has been completed, then the overcoat mortar 7 is able to be coated after the undercoat mortar 6 has been coated. Consequently, there is no need to halt work over long periods of time in order to cure the undercoat mortar 6 after the undercoat mortar 6 has been coated, and the timespan of the installation work is made shorter.

The alkaline dissolution reaction time of the coating layer 16 can be changed as is appropriate to the installation conditions, such as the time required for coating the undercoat mortar 6, location, season and weather at the time of installation. The detailed adjustment of the reaction time is performed by changing the proportional distribution of the polyvinyl alcohol and the co-polymer of polyvinyl acetate and acrylic acid which form the coating layer 16.

It is also possible to increase the water repellent property of the mortar substrate sheet 11*a* by adding wax at a proportion of, for example 2%, in the coating layer, or by coating with a water repellent agent having water repellent properties for only a designated period of time. In this case, the water absorption/retention sheet 13 does not absorb any surplus water even if the mortar substrate sheet 11*a* is made wet with rain or the like, and problems such as insufficient water absorption during mortar coating can be prevented.

Figure 3:
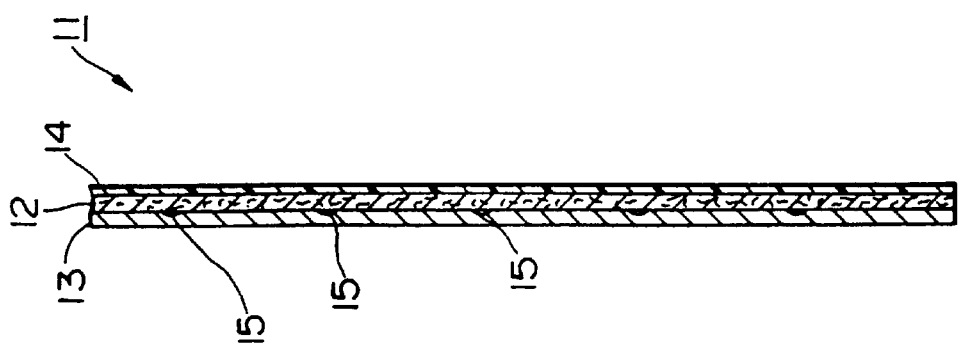
FIG. 3 is a section view showing an example of the structure of a mortar substrate sheet according to the present invention.
Figure 4:
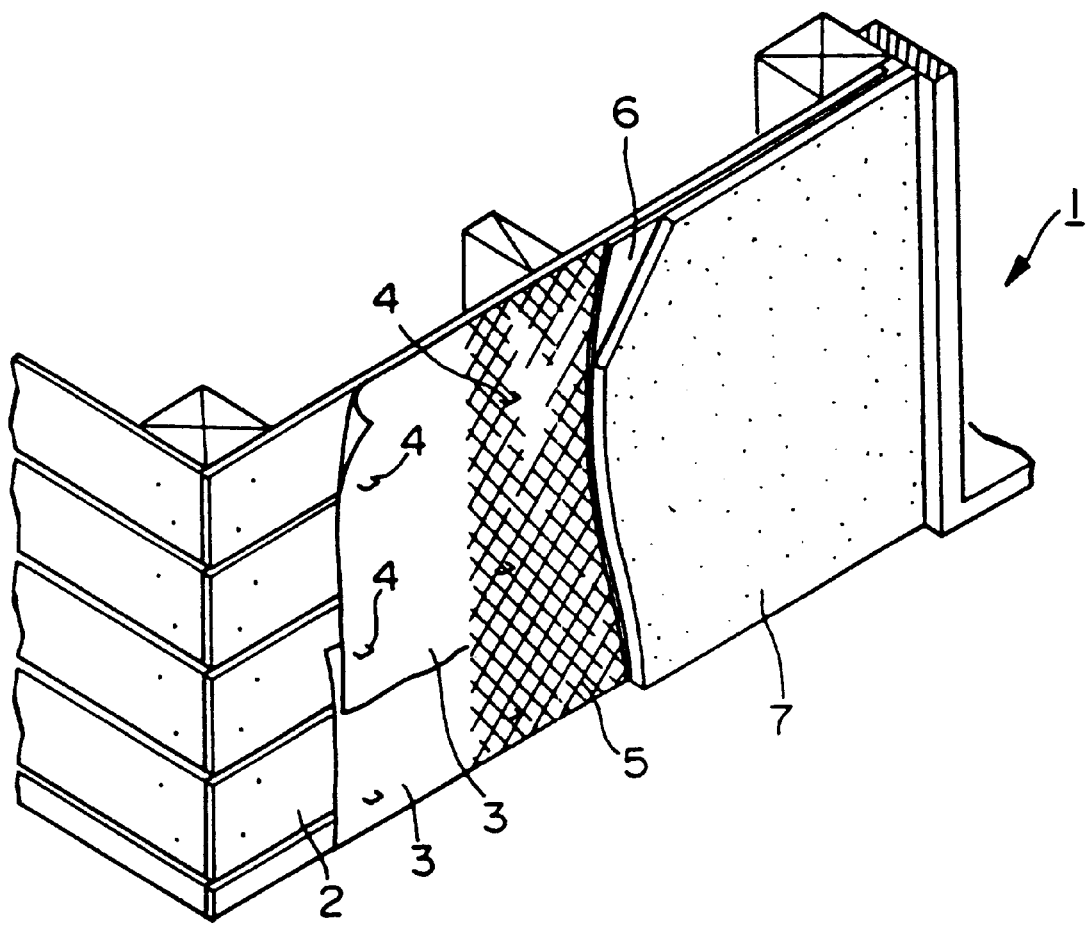
FIG. 4 is a perspective view of the outer wall of a building for explaining the mortar installation procedure for the outer wall.

A third embodiment of the mortar substrate sheet according to the present invention is shown in FIG. 3. This mortar substrate sheet 11*b* has the same structure as that of FIG. 1, except that a reinforcement sheet 17 is layered on the surface of the water absorption/retention sheet 13.

This reinforcement sheet 17 is formed from an unwoven fabric with reinforced tensile strength and tear strength with respect to the direction of arrangement, and the eyes (density) have a high adherence (anchor effect) with respect to mortar and are adjusted so as not to impair the effect of the water absorption/retention sheet 13 on the reverse side.

During installation, the mortar substrate sheet 11*b* is attached to the substrate 2 with the water absorption/retention sheet 13 on the substrate 2 side, the lath 5 is attached to the coating layer 16, then the undercoat mortar 6 is coated. Consequently, as with the above-mentioned first embodiment, the water in the undercoat mortar 6 is absorbed into the water absorption/retention sheet 13 after the passage of a designated period of time after beginning the coating of the undercoat mortar 6, allowing the overcoat mortar 7 to be coated. That is, with this mortar substrate sheet 11*b* as well, there is no need to halt work over long periods of time in order to cure the undercoat mortar 6 after the undercoat mortar 6 has been coated, and the timespan of the installation work is made shorter.

Moreover, since the mortar substrate sheet 11*b* is reinforced by means of the reinforcement sheet 17, it will not tear during installation work as with asphalt impregnated paper 3. Additionally, the anchor effect between the reinforcement sheet 17 and the undercoat mortar 6 prevents crumbling of the mortar 6, 7 during installation. Furthermore, the strength of the outer wall 1 after installation of the mortar 6, 7 is increased due to the strength of the reinforcement sheet 17 itself and the above-mentioned anchor effect, as a result of which the generation of fissures and cracks in the outer wall 1 or crumbling of the mortar 6, 7 can be prevented.

Instead of a water repellent agent, a coating layer (not shown in the drawings) which does not dissolve in water but dissolves in a strongly alkaline solution may be formed on the surface of the water absorption/retention sheet 13. Of course, the water repellent property of the mortar substrate sheet 11*b* can be increased by coating a small amount of water repellent agent onto the surface of the coating layer, or adding wax to the coating layer at a proportion of, for example, approximately 2%.

On the other hand, while water absorbed by the water absorption/retention sheet 13 in the above-mentioned mortar substrate sheets 11, 11*a*, 11*b* is retained within the water absorption/retention sheet 13, this water is gradually returned to the mortar 6, 7 so that over-drying does not occur when the mortar 6, 7 hardens, thereby curing the mortar 6, 7. As a result, with the above-mentioned mortar substrate sheets 11, 11*a*, 11*b*, the mortar exhibits an ideal hydration reaction, and mortar 6, 7 layers of the highest strength are formed. Furthermore, the occurrence of dry-out phenomena is also prevented because the mortar 6, 7 layers are not over-dried.

Additionally, with the above-mentioned mortar substrate sheets 11, 11*a*, 11*b*, corrosion of the substrate 2 due to seepage of water through the staple holes is positively prevented, since the sealing of the holes for the staples 4 is ensured by the resin layer 14 which has been coated with a water-resistant/moisture-permeable sheet 12. Furthermore, the water-resistant and moisture-permeable properties of the water-resistant/moisture-permeable sheet 12 prevent the intrusion of outside water into the substrate 2 and the generation of internal dew within the substrate 2.

Furthermore, a mortar wall formed unitarily from the undercoat mortar 6 and the overcoat mortar 7 is made on the outer wall 1, since the overcoat mortar 7 is coated in layers before the undercoat mortar 6 has dried. Consequently, the strength is relatively increased in comparison to the case wherein the overcoat mortar 7 is coated after the undercoat mortar 6 has dried and hardened.

Also, since the water absorption/retention sheet 13 is layered onto the water-resistant/moisture-permeable sheet 12 by means of point application of adhesive 15, the permeability of the water-resistant/moisture-permeable sheet 12 will not be impaired by the existence of the adhesive 15. In this case, the water-resistant/moisture-permeable sheet 12 and the water absorption/retention sheet 13 can be layered by applying the adhesive 15 in lines.

We claim:

1. A mortar substrate sheet, for placement between a substrate and mortar to be coated during installation of mortar to an outer wall of a building; characterized in that a water absorption/retention sheet having water absorbent and water retentive properties is layered onto a surface which faces said mortar, of a water-resistant/vapor-permeable sheet having water-resistant and vapor permeable properties;

said water-resistant/vapor-permeable sheet comprising an unwoven fabric layer and a resin layer which is layered onto a surface of said unwoven fabric layer facing said substrate, said resin layer having elasticity which enables it to seal holes made by staples attaching said mortar substrate sheet onto said outer wall;

and a reinforcement sheet, which increases the tensile strength and tear strength along a direction parallel to a surface of said mortar substrate sheet, is coated onto a surface of said water absorption/retention sheet.

2. A mortar substrate sheet according to claim 1, wherein a coating layer, which does not easily dissolve in water and dissolves in a strongly alkaline solution, is coated onto a surface of said water absorption/retention sheet.

3. A mortar substrate sheet according to claim 2, wherein a product, obtained by adding polyvinyl alcohol to a co-polymer of polyvinyl acetate and acrylic acid, is used in said coating layer.

4. A mortar substrate sheet according to claim 2, wherein wax is added to said coating layer.

5. A mortar substrate sheet according to claim 4, wherein a product, obtained by adding polyvinyl alcohol to a co-polymer of polyvinyl acetate and acrylic acid, is used in said coating layer.

6. A mortar substrate sheet according to claim 1, wherein at least one type of material selected from among paper, unwoven fabric, and woven fabric is used in said water absorption/retention sheet.

* * * * *